United States Patent
Yang

(10) Patent No.: US 6,590,728 B1
(45) Date of Patent: *Jul. 8, 2003

(54) HARD DISK HAVING EXTENDED DATA REGION

(75) Inventor: Min-Kwan Yang, Seoul (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 764 days.

(21) Appl. No.: 08/768,231

(22) Filed: Dec. 17, 1996

(30) Foreign Application Priority Data

Dec. 19, 1995 (KR) .............................. 95-52231

(51) Int. Cl.⁷ ................................. G11B 5/55
(52) U.S. Cl. ..................... 360/48; 360/78.14; 360/77.08
(58) Field of Search ......................... 360/48, 49, 77.08, 360/78.14, 77.05, 77.07

(56) References Cited

U.S. PATENT DOCUMENTS

| | | | | |
|---|---|---|---|---|
| 4,669,004 A | * | 5/1987 | Moon et al. .............. | 360/77.08 |
| 4,825,310 A | | 4/1989 | Song | |
| 4,964,009 A | | 10/1990 | Moriya et al. | |
| 5,073,834 A | | 12/1991 | Best et al. | |
| 5,278,703 A | | 1/1994 | Rub et al. | |
| 5,317,468 A | * | 5/1994 | Wakabayashi et al. ... | 360/77.08 |
| 5,339,207 A | | 8/1994 | Moon et al. | |
| 5,384,671 A | * | 1/1995 | Fisher ..................... | 360/77.08 |
| 5,440,474 A | | 8/1995 | Hetzler | |
| 5,448,433 A | * | 9/1995 | Morehouse et al. ....... | 360/97.2 |
| 5,455,720 A | * | 10/1995 | Norton .................... | 360/77.02 |
| 5,459,623 A | | 10/1995 | Blagaila et al. | |
| 5,475,540 A | | 12/1995 | Gold | |
| 5,526,202 A | * | 6/1996 | Blagaila et al. .......... | 360/77.08 |
| 5,526,211 A | | 6/1996 | Hetzler | |
| 5,544,135 A | * | 8/1996 | Akin et al. ............... | 360/77.08 |
| 5,570,241 A | * | 10/1996 | Nielsen et al. ............. | 360/46 |
| 5,608,587 A | * | 3/1997 | Smith ...................... | 360/77.08 |
| 5,615,190 A | * | 3/1997 | Best et al. .................. | 360/58 |
| 5,627,695 A | * | 5/1997 | Prins et al. .............. | 360/77.08 |
| 5,646,797 A | * | 7/1997 | Kadlec et al. ........... | 360/77.08 |
| 5,659,437 A | * | 8/1997 | Tsunekawa et al. ...... | 360/77.08 |
| 5,740,358 A | * | 4/1998 | Geldman et al. ............ | 360/48 |
| 5,748,401 A | * | 5/1998 | Kawai ..................... | 360/77.08 |
| 5,760,983 A | * | 6/1998 | Cowen ..................... | 360/77.08 |
| 5,815,332 A | * | 9/1998 | Suzuki et al. ................. | 360/48 |
| 5,825,578 A | * | 10/1998 | Shrinkle et al. ......... | 360/77.08 |
| 5,828,516 A | * | 10/1998 | Park ........................ | 360/77.08 |

* cited by examiner

*Primary Examiner*—Nabil Hindi
(74) *Attorney, Agent, or Firm*—Robert E. Bushnell, Esq.

(57) ABSTRACT

A hard disk includes at least one recording surface. The recording surface bears a plurality of servo sectors with each one of the servo sectors including a servo field and a data sector. The servo field has a gray code, a servo address mark and servo bursts with a servo identification recorded in the servo bursts. The servo identification is recorded in the servo bursts by encoding pulse timing intervals of the servo bursts.

45 Claims, 8 Drawing Sheets

| SERVO_SECTOR m | | | | |
|---|---|---|---|---|
| SERVO_FIELD m | | | | |
| AGC& SYNC | SAM | IDX | GRAY_CODE (13bits) | BURSTS P Q A B |
| 4.8 μsec | 0.8 μsec | 0.8 μsec | 5.2 μsec | 4.8 μsec |

| SERVO_SECTOR m | | | | | | | | | |
|---|---|---|---|---|---|---|---|---|---|
| DATA_SECTOR n | | | | | | | | | |
| ID_FIELD of DATA_SECTOR n | | | | | | DATA_FIELD of DATA_SECTOR n | | | |
| AGC& SYNC | AM | ID C H S | FLAG | SPLIT INFO | CRC | WRITE SPLICE | AGC& SYNC | AM | DATA_ FIELD | ECC |
| 14 byte | 1 byte | 3 byte | 1 byte | 2 byte | 2 byte | 1 byte | 14 byte | 1 byte | 512 byte | 11 byte |

| SERVO_SECTOR m | | | | | | | | | |
|---|---|---|---|---|---|---|---|---|---|
| DATA_SECTOR n+1(split) | | | | | | | | | |
| ID_FIELD of DATA_SECTOR n+1 | | | | | | SPLIT 1ST DATA F | | | |
| AGC& SYNC | AM | ID C H S | FLAG | SPLIT INFO | CRC | WRITE SPLICE | AGC& SYNC | AM | DATA_ FIELD |
| 14 byte | 1 byte | 3 byte | 1 byte | 2 byte | 2 byte | 1 byte | 14 byte | 1 byte | 512-k byte |

| SERVO_SECTOR m+1 | | | |
|---|---|---|---|
| SERVO_FIELD m+1 | | | |
| AGC& SYNC | SAM | IDX | GRAY_CODE (13bits) |
| 4.8 μsec | 0.8 μsec | 0.8 μsec | 5.2 μsec |

Fig. 2

| SERVO_SECTOR m | | | | | |
|---|---|---|---|---|---|
| SERVO_FIELD m | | | | | |
| AGC & SYNC | SAM | IDX | GRAY_CODE (X bits) | HEAD | BURSTS P Q A B |
| X μsec | X μsec | X μsec | X μsec | X μsec | X μsec |

| SERVO_SECTOR m | | | | | | |
|---|---|---|---|---|---|---|
| DATA_SECTOR n | | | | DATA_SECTOR n+1 (split) | | |
| DATA_FIELD of DATA_SECTOR n | | | | SPLIT 1ST DATA FIELD | | |
| AGC & SYNC | AM | DATA_FIELD | ECC | AGC & SYNC | AM | DATA_FIELD |
| X byte | X byte | 512 byte | X byte | X byte | X byte | 512-k byte |

| SERVO_SECTOR m+1 | | | | | |
|---|---|---|---|---|---|
| SERVO_FIELD m | | | | | |
| AGC & SYNC | SAM | IDX | GRAY_CODE (X bits) | HEAD | BURSTS P Q A B |
| X μsec | X μsec | X μsec | X μsec | X μsec | X μsec |

Fig. 4

SSID OR HEAD_INCLUDE_SERVO_BURST SECTOR FORMAT

| SERVO_SECTOR m |||||
|---|---|---|---|---|
| SERVO_FIELD m |||||
| AGC& SYNC | SAM | IDX | GRAY_CODE (X bits) | BURSTS P Q A B |
| X μsec | X μsec | X μsec | X μsec | SSID OR HEAD |

| SERVO_SECTOR m ||||||
|---|---|---|---|---|---|
| DATA_SECTOR n ||| DATA_SECTOR n+1(split) |||
| DATA_FIELD of DATA_SECTOR n ||| SPLIT 1ST DATA_FIELD |||
| AGC& AYNC | AM | DATA_ FIELD | ECC | AGC& SYNC | AM | DATA_FIELD |
| X byte | X byte | 512 byte | X byte | X byte | X byte | 512-k byte |

| SERVO_SECTOR m+1 |||||
|---|---|---|---|---|
| SERVO_FIELD m+1 |||||
| AGC& SYNC | SAM | IDX | GRAY_CODE (X bits) | BURSTS P Q A B |
| X μsec | X μsec | X μsec | X μsec | SSID OR HEAD |

Fig. 5

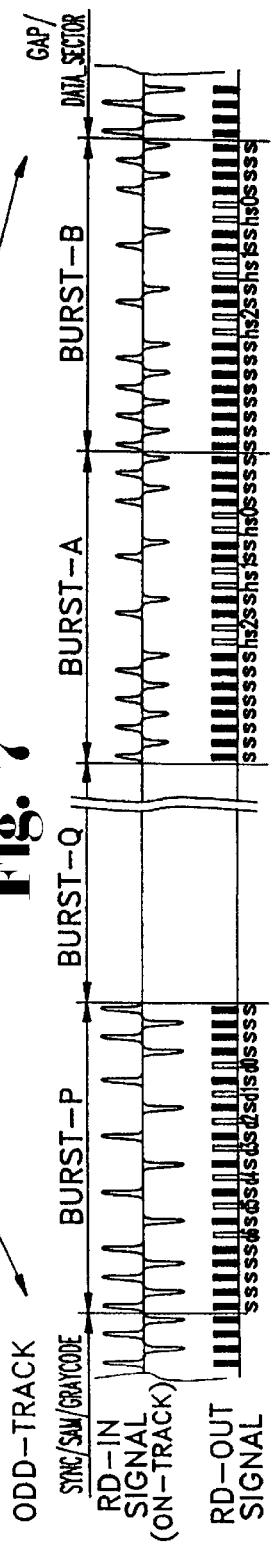

HARD DISK HAVING EXTENDED DATA REGION

CROSS-REFERENCE TO RELATED APPLICATIONS

This application makes reference to, incorporates the same herein, and claims all benefits accruing under 35 U.S.C. §119 arising from an application for Hard Disk Having Extended Data Region earlier filed in the Korean Industrial Property Office on Dec. 19, 1995 and there duly assigned Serial No. 52231/1995.

BACKGROUND OF THE INVENTION

The present invention relates to a hard disk having an extended data region, and more particularly, to a hard disk having a servo sector format that provides for an extended data region by recording specific servo signals in burst areas of a servo field.

In general, there are two servo sector formats for a hard disk drive, namely a dedicated servo format and an embedded servo format. With a dedicated servo format, one surface of a hard disk is used for recording servo signals and the other surfaces are used for recording data signals. With an embedded servo format, servo signals and data signals are simultaneously recorded in each surface of the hard disk.

An example of the embedded servo format is disclosed in U.S. Pat. No. 5,278,703 entitled Embedded Servo Banded Format For Magnetic Disks For Use With A Data Processing System issued to Rub et al. In Rub et al. '703, the system records sector headers at a frequency which is optimal for the recording of address information in the shortest sector, and records data at frequencies which are optimal for the recording of information in the disk space allocated to the data portion of the various lengths of sectors. The system synchronizes to the headers using conventional embedded servo synchronizing methods. While conventional art, such as Rub et al. '703 provides advantages in its own right, I believe that an improved servo format for a hard disk can be contemplated.

SUMMARY OF THE INVENTION

Therefore, it is an object of the present invention to provide an improved hard disk that provides an extended data region.

It is another object to provide a hard disk having a data region that is extended by reducing a servo field so that the servo overhead is reduced in terms of spacial allocation.

To achieve these and other objects, the present invention provides a hard disk comprising at least one recording surface. The recording surface bears a plurality of servo sectors with each one of the servo sectors including a servo field and a data sector. The servo field has a gray code, a servo address mark and servo bursts with a servo identification recorded in the servo bursts. The servo identification is recorded in the servo bursts by encoding pulse timing intervals of the servo bursts.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 illustrates a servo sector format for a hard disk having an ID field in a general hard disk drive;

FIG. 4 illustrates a servo sector format for a hard disk that excludes an ID field and has a head bit signal recorded in a servo field in a general hard disk drive;

FIG. 5 illustrates a servo sector format for a hard disk in a hard disk drive constructed according to the principles of the present invention;

FIG. 6 illustrates details of the servo field in the servo sector format of FIG. 5;

FIG. 7 illustrates the waveforms of signals read from burst areas of the servo field of FIG. 6 on an odd track;

FIG. 8 illustrates the waveforms of signals read from the burst areas of the servo field of FIG. 6 on an even track;

DETAILED DESCRIPTION OF THE INVENTION

Figure 1:
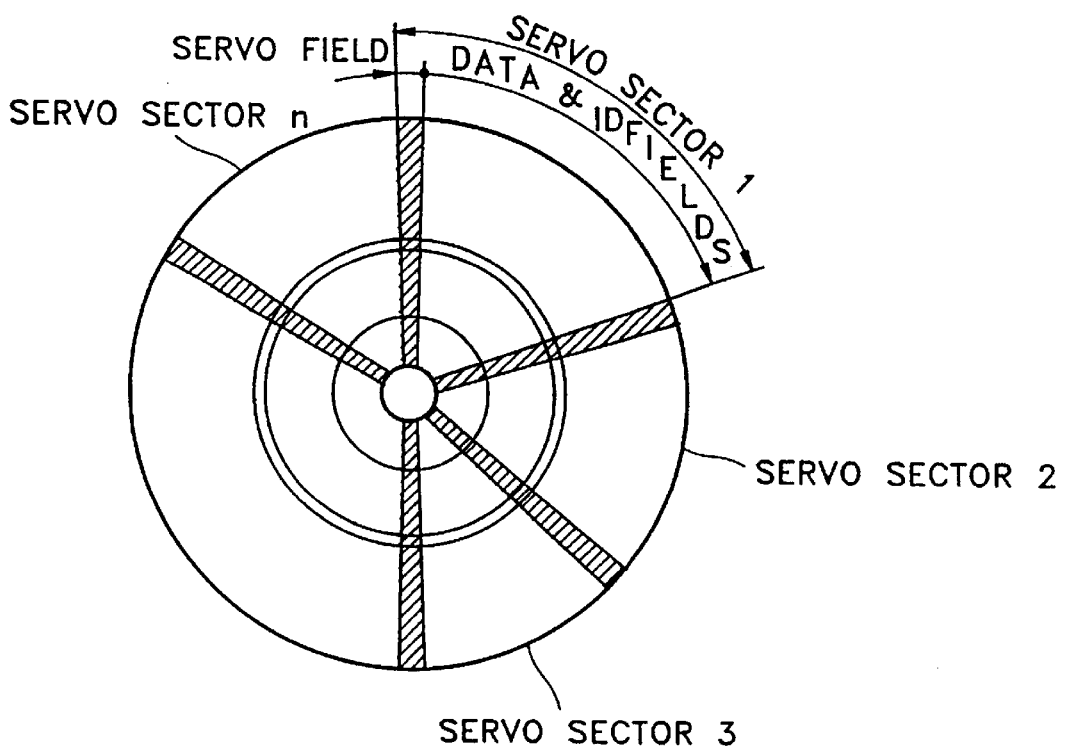
FIG. 1 illustrates a hard disk employing an embedded servo format.

Turning now to the drawings and referring to FIG. 1, a hard disk employing an embedded servo format is shown. In FIG. 1, an n number of servo sectors are formed on a hard disk. Each servo sector includes: a servo field represented by a hashed-line portion, and a data sector represented by a remaining portion of the servo sector. The data sector is divided into an ID field and a data field. Information required for a head to read the hard disk (i.e., to seek and follow a track) is recorded in the servo field. Data to be used by a user is recorded in the data field. The ID field is used to record IDs, which are data related to a cylinder, the heads, and sectors. The recorded IDs enable the head to accurately read and write needed information from and to the data field.

Referring to FIG. 2, a servo sector format for a hard disk having an ID field in a general hard disk drive is shown. In FIG. 2, a servo sector includes a servo field and a data sector. The data sector is divided into an ID field and a data field. Signals needed for driving the hard disk are sequentially recorded in the servo field. That is, automatic gain control & synchronization signals (AGC & SYNC), a servo address mark (SAM), an index (IDX), a gray code, and bursts are recorded in the servo field. The automatic gain control and synchronization signals (AGC & SYNC) enable gain control and synchronization functions. The servo address mark (SAM) indicates a time point for generating control signals. The index (IDX) is a reference signal for controlling the rotating speed of a spindle motor (not shown), and indicates a starting point of each track. The gray code indicates track-related information, namely, a track address. The bursts are reference signals for detecting the degree to which a head (not shown) of the hard disk drive deviates from the center of a track. The ID field is used to record data related to a cylinder, the heads, and sectors. This recorded data enables the head to accurately read and write needed information from and to the data field. Data to be used by a user is recorded in the data field.

To reproduce a necessary signal recorded on a hard disk, the head should seek a head position controlling signal recorded in the ID field. This operation is referred to as "overhead". It is preferable to reduce such overhead since, as the overhead consumes a greater amount of time, it takes a greater amount of time to reproduce or record user-intended data. Therefore, hard disks adopting headerless formats based on a wedge ID and a pseudo ID have been developed as a result of efforts expended on the embedded servo method in order to reduce the overhead. Consequently, the ID field can be removed from the data sector.

Figure 3:
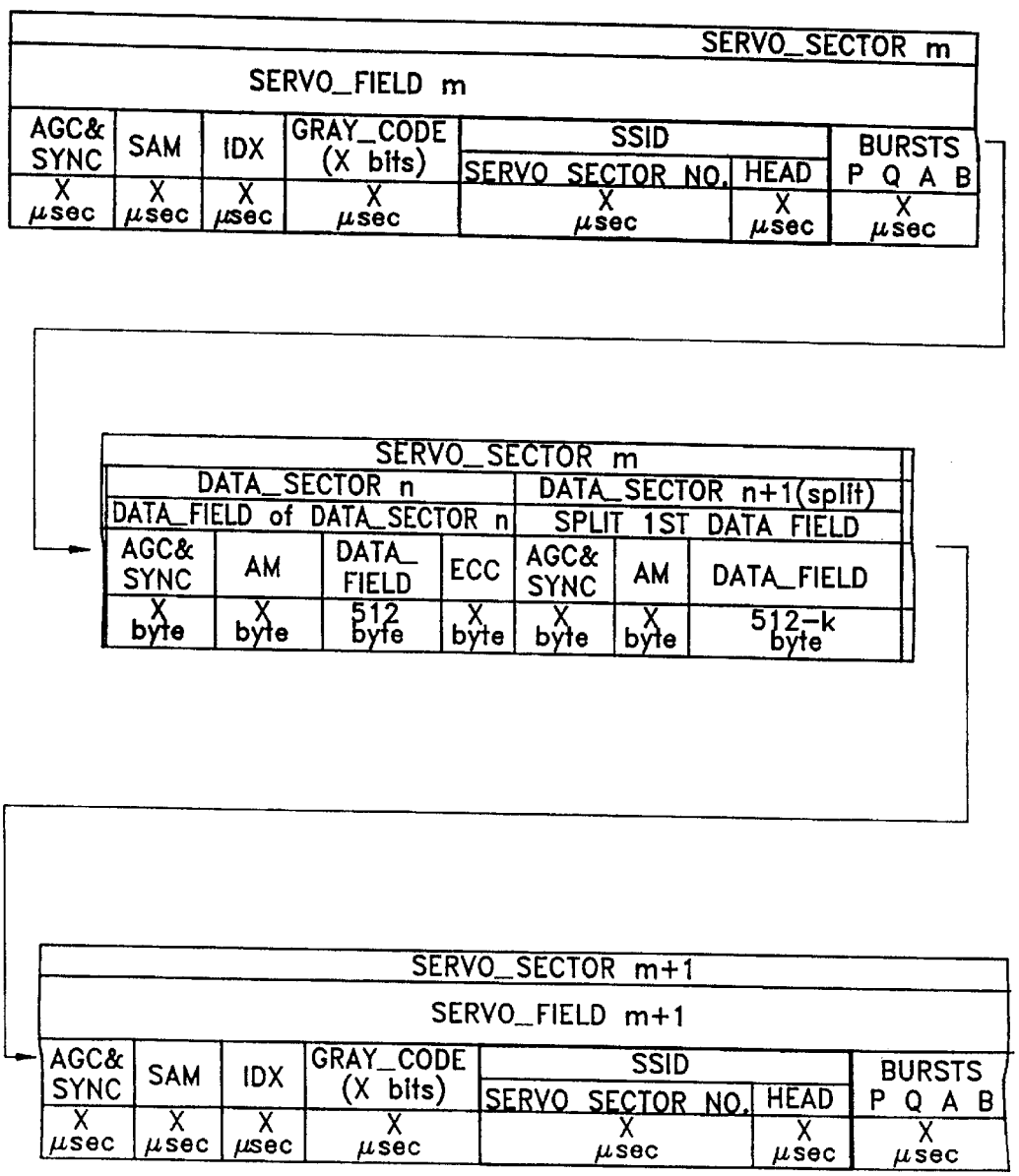
FIG. 3 illustrates a servo sector format for a hard disk that excludes an ID field and has an ID recorded in a servo field in a general hard disk drive.

Referring to FIGS. 3 and 4, headerless formats are shown. In FIGS. 3 and 4, ID fields are not found in the data sectors, and a single servo sector is comprised of a servo field and a data field. That is, a data sector is dedicated to the data field without an ID field. A servo sector ID (SSID) having a servo sector number (SSN) and a head bit for selecting a head of the hard disk drive as shown in FIG. 3, or an ID having only a head bit, as shown in FIG. 4, is recorded in the servo field.

Although the aforementioned embedded servo formats decrease servo overhead to some extent by excluding the ID field from the data sector, they are still limited in their abilities to reduce the time required for seeking and following intended data.

Referring now to FIG. 5, a servo sector format for a hard disk in a hard disk drive constructed according to the principles of the present invention is shown. In particular, FIG. 5 illustrates a servo sector format having a servo sector identification (SSID) or a head selection enabling head bit (hereinafter referred to as "head bit") recorded in burst areas of a recording surface in a hard disk drive. FIG. 6 illustrates a portion of the servo sector format shown in FIG. 5. FIGS. 7 and 8 illustrate the waveforms of signals read, respectively, from odd and even tracks of the burst area in the servo sector format shown in FIG. 5.

Referring to FIG. 5, a head bit, servo sector ID (SSID), or an ID (hereinafter also referred to as "servo signal") is recorded in the burst area in a hard disk format of the hard disk drive constructed according to the principles of the present invention. As shown in FIG. 5, a relative extension of a data field is accomplished by recording servo burst signals and a servo ID together in a servo burst area of a servo field, thus reducing the area of the servo field. The servo burst signals serve to detect the deviation of a head (not shown) of the hard disk drive, and are amplitude-sampled for use in controlling the position of the head. The servo ID is recorded together with the burst signals as shown in FIGS. 7 (in the case of odd tracks) and 8 (in the case of even tracks) by encoding the pulse timing intervals of the servo burst signals having pulses of the same amplitude recorded in the same timing intervals.

In the present invention, the ID field of a general hard disk format (see FIG. 2) and a servo signal recording area of headerless format methods (see FIGS. 3 and 4) are omitted.

Recording the servo ID along with the burst signals will now be described in detail with reference to FIG. 10, which shows the positions of the burst signals on hard disk tracks.

Figure 10:
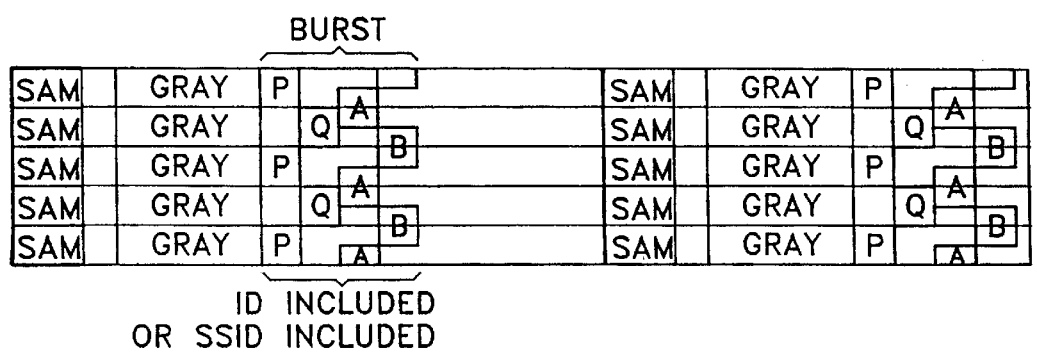
FIG. 10 illustrates the positions of servo burst signals on a hard disk in the hard disk drive constructed according to the principles of the present invention.

In FIG. 10, the servo signal is recorded together with burst signals P and Q. The burst signal P is positioned on an odd track, and the burst signal Q is positioned on an even track. Irrespective of whether tracks are even or odd, the servo ID, such as a header, servo sector ID (SSID), or an index signal, can be detected since it is recorded together with both the burst signals P and Q.

Even when a head (not shown) of the hard disk drive is positioned on the boundary between tracks, the servo ID can be detected by recording the servo ID along with burst signals A and B in the first and second track boundary areas, respectively. This is to compensate for errors that are possibly generated from the burst signals P and Q, and further increases the reliability of the servo signal. Moreover, the reason for recording the servo ID together with the burst signals A and B is to facilitate detection of the servo ID during off-track as well as on-track situations. That is, when the head deviates toward the first boundary area having the burst signal A recorded therein, the amplitude of the detected burst signal B decreases, whereas the amplitude of the burst signal A increases. Contrary results occur when the head deviates toward the second boundary area having the burst signal B recorded therein. Therefore, the servo ID can be detected regardless of the direction in which the head deviates from a track.

In addition, according to another embodiment, a servo sector number (SSN) included in the servo sector ID (SSID) (see FIG. 3) may be recorded together with the burst signals P and Q, while the head selecting head bit may be recorded in the first and second track boundary areas.

Furthermore, a servo sector number (SSN) can be detected in both even and odd tracks, and a head bit can easily be detected when a head is off-track as well as on track. This can be achieved by modifying the headerless sector format shown in FIG. 3 to match the sector format of FIG. 5, and recording the servo sector number (SSN) together with the burst signals P and Q and the head bit together with the burst signals A and B, as shown in FIGS. 6, 7, and 8. This enables easy detection of the burst signals regardless of a head's on/off-track state, as described above.

Detection of the burst signals regardless of head deviation from a track can be obtained by modifying the sector format of FIG. 4 to match the sector format of FIG. 5, and recording the servo sector number (SSN) together with the burst signals P and Q to detect the servo sector number (SSN) regardless of whether the head is on an even or odd numbered track, and recording the head bit together with the burst signals A and B in order to easily detect the head bit when the head is in an off-track state, as well as an on-track state, as shown in FIGS. 6, 7, and 8.

Figure 9:
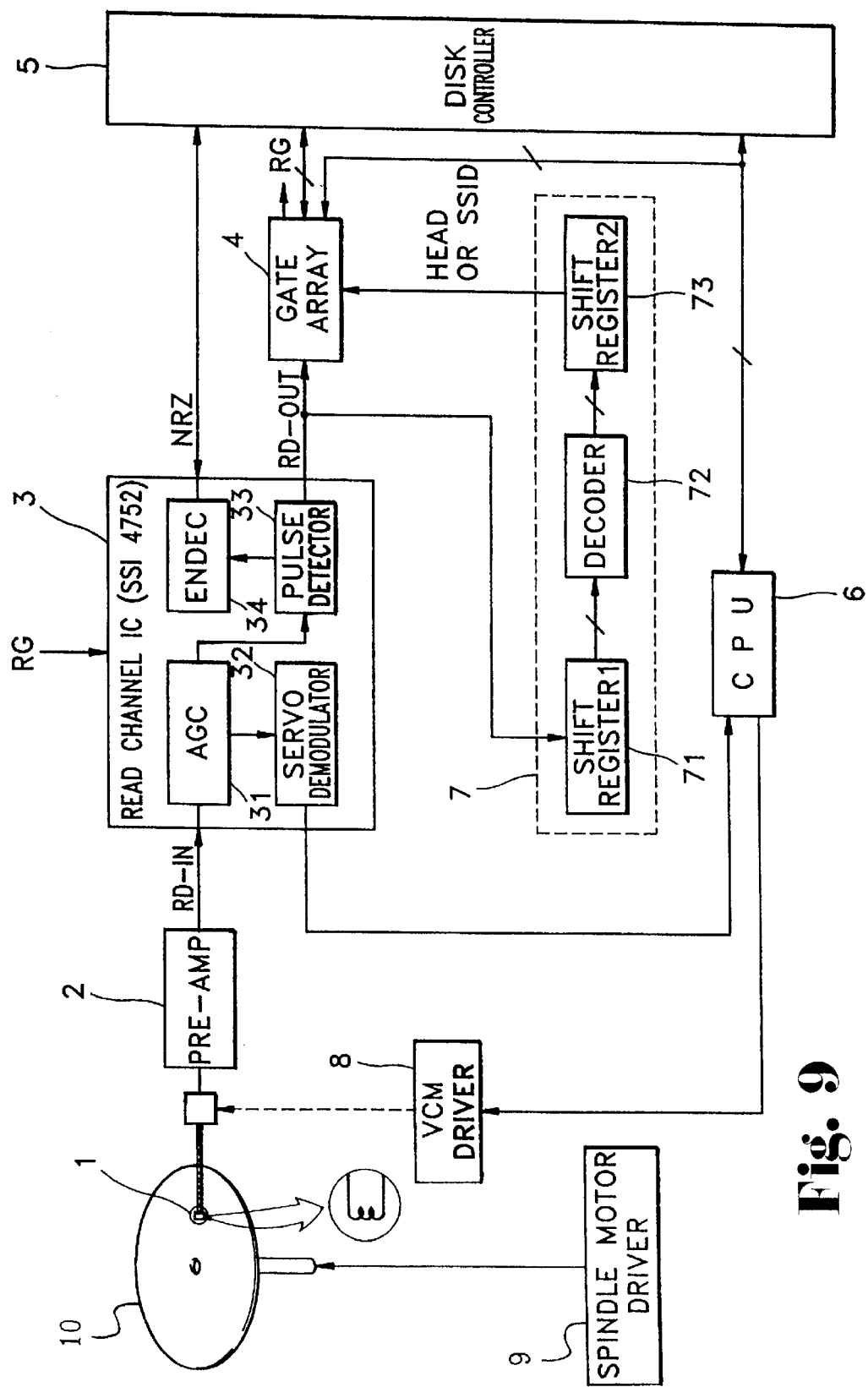
FIG. 9 illustrates a block diagram of a servo circuit in the hard disk drive constructed according to the principles of the present invention.

Referring to FIGS. 7 to 10, the operation of a hard disk drive constructed according to the principles of the present invention will now be described. FIG. 9 is a block diagram of a servo circuit for the hard disk drive of the present invention, and its structure will be described with reference thereto.

In FIG. 9, a preamplifier 2 amplifies a fine analog signal detected by a head 1 before the signal is transmitted to a read channel integrated circuit (IC) 3 as an analog read-in signal (RD-IN). The read channel integrated circuit (IC) 3 converts the analog read-in signal (RD-IN) received from preamplifier 2 into a digital signal, decodes the digital signal to generate no return to zero (NRZ) data, and outputs the no return to zero (NRZ) data to a disk controller 5. An automatic gain controller (AGC) 31 automatically controls the gain of the read-in signal (RD-IN) received from preamplifier 2 whose amplitude varies depending on head 1 and the positions of the head 1 on a disk and a track. This keeps the amplitude constant. A pulse detector 33 receives and clips the analog signal at a predetermined level or above, and generates a digital pulse signal. An encoder/decoder (ENDEC) 34 decodes the digital signal provided from pulse generator 33 during a read operation, encodes no return to zero (NRZ) data received from disk controller 5, and outputs the encoded data to preamplifier 2 during a write operation. A servo demodulator 32 samples and holds the amplitudes of the burst signals P, Q, A, and B, and sends information of the burst amplitudes to a central processing unit (CPU) 6. A gate array 4 generates control signals, such as a read gate (RG) signal, required to drive a disk 10. Disk controller 5 serves as an interface in that it sends the no return to zero (NRZ) data (i.e., read information) received from read channel integrated circuit (IC) 3 to a host (PC), and transmits an instruction from the host to the system.

Central processing unit (CPU) 6 controls the entire system, including the gate array 4, the disk controller 5, a voice coil motor (VCM) driver 8, etc. A head bit or servo sector ID (SSID) signal processor 7 includes a first shift register 71, a decoder 72 and a second shift register 73, and selectively processes a head bit or a servo sector ID (SSID) from a read out signal (RD-OUT) received from the read channel integrated circuit (IC) 3, and sends the processed result to the gate array 4. That is, when data recorded in a burst area is converted into a digital signal in the read channel integrated circuit (IC) 3 and input to the first shift register 71, the digital signal is transmitted in parallel to the decoder 72 to thereby be decoded. The decoded data is output from decoder 72 in parallel to the second register 73, and the second shift register 73 sends the data in series to the gate array 4. Gate array 4 recognizes the position of a current servo sector and the selected head 1 from the data provided by the decoder 72 and second register 73, and outputs information required for controlling the disk controller 5 and central processing unit (CPU) 6 via a bus. In FIG. 9, the disk 10 serving as the recording medium is rotated by a spindle motor (not shown) driven by a spindle motor driver 9.

The operation of the servo circuit of FIG. 9 will now be described.

In FIG. 9, servo data is recorded in the form of a read-back signal in burst areas of the hard disk 10, as shown in FIGS. 7 and 8. After servo-writing, the servo signal is detected by the head 1 and sent to the preamplifier 2. Signals detected from odd and even tracks of the hard disk 10 are analog signals, as shown in FIGS. 7 and 8. That is, referring to FIGS. 7 and 10, the signal detected from an odd track includes the burst signal P having a maximum amplitude, and the burst signals A and B of the first and second boundary areas, which have amplitudes half as large as the maximum amplitude. Referring to FIGS. 8 and 10, the signal detected from an even track is comprised of the burst signal Q having a maximum amplitude, and the burst signals A and B of the first and second boundary areas, which have amplitudes half as large as the maximum amplitude. Since the burst signals P and Q have sufficiently large amplitudes, the servo signal recorded in the burst signal areas can easily be detected.

The detected signal is amplified by the preamplifier 2, and output as the read-in (RD-IN) signal to the read channel integrated circuit (IC) 3. The read channel integrated circuit (IC) 3 converts the analog read-in (RD-IN) signal received from preamplifier 2 into a digital signal. That is, the read-in (RD-IN) signal is converted into the read-out (RD-OUT) signal in the pulse detector 33, and the read-out (RD-OUT) signal is output to the gate array 4. The read-out (RD-OUT) signal is a digital signal, as shown in FIGS. 7 and 8. The read-out (RD-OUT) signal is sent to the decoder 72 via the first shift register 71, and is decoded by the decoder 72. The decoded read-out (RD-OUT) signal is transmitted to the second shift register 73. A head bit, an ID, and a servo sector ID (SSID), being servo signals, are selectively transmitted to the gate array 4 via the first shift register 71, decoder 72, and second shift register 72. The gate array 4 receives the servo signals, determines the current location of head 1 on the servo sector, and transmits a control signal to disk controller 5 via a bus. Central processing unit (CPU) 6 controls the disk drive through the disk controller 5 and the voice coil motor (VCM) driver 8 according to a transmitted signal.

Next, the data to be recorded in a burst area will be described in detail.

During servo-writing, signals such as a servo sector number (SSN) and a head selecting, head bit positioned in a servo field in a general embedded servo method are recorded in the areas of the servo burst signals P, Q, A, and B, in the manner shown in FIGS. 7 and 8.

Therefore, when reading signals from an even track, no burst signal P is found, the burst signal Q has a maximum amplitude, and the burst signals A and B have half the maximum amplitude, as shown in FIGS. 7 and 10. On the other hand, when reading signals from an odd track, the burst signal P has a maximum amplitude, there is no burst signal Q, and the burst signals A and B have half the maximum amplitude.

Since the burst signals P and Q are alternately read according to a track, and thus have a large amplitude, a head selection number, and a servo sector number (SSN) are recorded in a predetermined signal format. That is, an encoding format is used instead of the headerless sector format. Thus, corresponding data, such as a gray code or a servo sector number (SSN) is obtained as decoded data via the first shift register 71, decoder 72, and second shift register 73 from the read-out (RD-OUT) signal, regardless of an off-track or on-track state of the head 1.

The burst signals A and B have amplitudes half as large as those of the burst signals P and Q in an on-track state, as shown in FIGS. 7 and 8. In an off-track state, one of the burst signals A and B can be read out since the larger the amplitude of the burst signal A, the smaller the amplitude of the burst signal B, and vice versa. In these burst areas, data like the servo sector number (SSN) or a cylinder head selecting, head bit, as in the embodiment of FIGS. 7 and 8, can be recorded.

As described above, in the hard disk of the present invention having an extended data region, servo burst signals are utilized in terms of timing (i.e., frequency modulation, as well as amplitude modulation) by recording servo signal,s such as an ID and a servo sector ID (SSID) together with burst signals whose amplitudes are detected in order to locate a head, and thus control its location. Therefore, the area of a servo field is reduced while the area of a data field is relatively increased, thereby increasing the data storage capacity of the hard disk. Furthermore, the reliability of data reproduction can be increased by repeatedly recording servo data in the areas of burst signals P, Q, A, and B, and reproducing the servo data.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A hard disk comprising at least one recording surface, said recording surface bearing a plurality of servo sectors with each one of said servo sectors including a servo field and a data sector, said servo field having a gray code, a servo address mark and servo bursts with at least one of a servo sector number and a head bit recorded in said servo bursts;

wherein said at least one of a servo sector number and a head bit is recorded in said servo bursts by encoding pulse timing intervals of said servo bursts, and wherein said head bit is recorded in A and B portions of said servo bursts to enable detection of said head bit by a head when said head is in an off-track state and an on-track state.

2. A hard disk comprising at least one recording surface, said recording surface bearing a plurality of servo sectors with each one of said servo sectors including a servo field and a data sector, said servo field having a gray code, a servo address mark and servo bursts with at least one of a servo sector number and a head bit recorded in said servo bursts;

wherein said servo sector number is recorded in P and Q portions of said servo bursts to enable detection of said servo sector number by a head when said head is on an even numbered track and an odd numbered track.

3. The hard disk as claimed in claim 1, wherein said servo sector number is recorded in P and Q portions of said servo bursts.

4. A hard disk drive, comprising:

a disk having at least one recording surface bearing a plurality of servo sectors with each one of said servo sectors including a servo field and a data sector, said servo field having a gray code, a servo address mark and servo bursts with a servo identification recorded in said servo bursts;

head means for reading data including said servo identification from said recording surface of said disk;

processing means for processing said servo identification to generate a processed output signal; and a gate array for receiving said processed output signal and determining a current position of said head means from said processed output signal;

wherein said processing means comprises a pulse detector for providing a digital output signal and an encoder/decoder connected directly to said pulse detector for decoding the digital output signal during a read operation.

5. The hard disk drive as claimed in claim 4, wherein said servo identification is recorded in said servo bursts by encoding pulse timing intervals of said servo bursts.

6. The hard disk as claimed in claim 4, wherein said servo identification comprises a head bit to enable head selection, and a servo sector number.

7. The hard disk as claimed in claim 6, wherein said servo sector number is recorded in P and Q portions of said servo bursts, and said head bit is recorded in A and B portions of said servo bursts.

8. A hard disk drive, comprising:

a disk having at least one recording surface bearing a plurality of servo sectors with each one of said servo sectors including a servo field and a data sector, said servo field having a gray code, a servo address mark and servo bursts with at least one of a servo sector number and a head bit recorded in said servo bursts;

head means for reading data including said at least one of a servo sector number and a head bit from said recording surface of said disk;

processor means for processing said at least one of a servo sector number and a head bit to generate a processed output signal; and a gate array for receiving said processed output signal, and determining a current position of said head means from said processed output signal;

wherein said processor means comprises an automatic gain control circuit and a servo demodulator connected to said automatic gain control circuit for sampling and holding amplitudes of burst signals and for providing, as an output, information relative to the amplitudes of the burst signals.

9. The hard disk drive as claimed in claim 8, wherein said at least one of a servo sector number and a head bit is recorded in said servo bursts by encoding pulse timing intervals of said servo bursts.

10. The hard disk as claimed in claim 8, wherein said servo sector number is recorded in P and Q portions of said servo bursts, and said head bit is recorded in A and B portions of said servo bursts.

11. The hard disk drive as claimed in claim 4, wherein said processing means comprises a pre-amplifier.

12. The hard disk drive as claimed in claim 11, wherein said processing means further comprises a read channel integrated circuit connected between said pre-amplifier and said gate array.

13. A hard disk drive comprising:

a disk having at least one recording surface bearing a plurality of servo sectors with each one of said servo sectors including a servo field and a data sector, said servo field having a gray code, a servo address mark and servo bursts with a servo identification recorded in said servo bursts;

head means for reading data including said servo identification from said recording surface of said disk;

processing means for processing said servo identification to generate a processed output signal; and a gate array for receiving said processed output signal and determining a current position of said head means from said processed output signal;

wherein said processing means comprises a pre-amplifier, an automatic gain control circuit connected to said pre-amplifier for producing a controlled gain output, a pulse detector connected between said automatic gain control circuit and said gate array for providing a digital output signal to said gate array, and an encoder/decoder directly connected to said pulse detector for decoding the digital output signal during a read operation.

14. A hard disk drive comprising:

a disk having at least one recording surface bearing a plurality of servo sectors with each one of said servo sectors including a servo field and a data sector, said servo field having a gray code, a servo address mark and servo bursts with at least one of a servo sector number and a head bit recorded in said servo bursts;

head means for reading data including said at least one of a servo sector number and a head bit from said recording surface of said disk;

processing means for processing said at least one of a servo sector number and a head bit to generate a processed output signal; and a gate array for receiving said processed output signal and determining a current position of said head means from said processed output signal;

wherein said processing means comprises a pre-amplifier, an automatic gain control circuit connected to said pre-amplifier for producing a controlled gain output, a pulse detector connected between said automatic gain control circuit and said gate array for providing a digital output signal to said gate array, and a servo demodulator connected to said automatic gain control circuit for sampling and holding amplitudes of the burst signals and for providing, as an output, information relative to the amplitudes of the burst signals.

15. The hard disk drive as claimed in claim 14, wherein said processing means further comprises a central processing unit for receiving, from said servo demodulator, the information relative to the amplitudes of the burst signals.

16. The hard disk drive as claimed in claim 8, wherein said processor means comprises a pre-amplifier.

17. The hard disk drive as claimed in claim 16, wherein said processor means further comprises a read channel integrated circuit connected between said pre-amplifier and said gate array.

18. A hard disk drive comprising:
a disk having at least one recording surface bearing a plurality of servo sectors with each one of said servo sectors including a servo field and a data sector, said servo field having a gray code, a servo address mark and servo bursts with a servo identification recorded in said servo bursts;
head means for reading data including said servo identification from said recording surface of said disk;
processing means for processing said servo identification to generate a processed output signal;
a gate array for receiving said processed output signal, and determining a current position of said head means from said processed output signal to generate a control signal; and
control means for controlling said head in response to said control signal;
wherein said processing means comprises a pre-amplifier, an automatic gain control circuit connected to said pre-amplifier for producing a controlled gain output, a pulse detector connected between said automatic gain control circuit and said gate array for providing a digital output signal to said gate array, and an encoder/decoder connected directly to said pulse detector for decoding the digital output signal during a read operation.

19. A hard disk drive comprising:
a disk having at least one recording surface bearing a plurality of servo sectors with each one of said servo sectors including a servo field and a data sector, said servo field having a gray code, a servo address mark and servo bursts with at least one of a servo sector number and a head bit recorded in said servo bursts;
head means for reading data including said at least one of a servo sector number and a head bit from said recording surface of said disk;
processing means for processing said at least one of a servo sector number and a head bit to generate a processed output signal;
a gate array for receiving said processed output signal, and determining a current position of said head means from said processed output signal to generate a control signal; and
control means for controlling said head in response to said control signal;
wherein said processing means comprises a pre-amplifier, an automatic gain control circuit connected to said pre-amplifier for producing a controlled gain output, a pulse detector connected between said automatic gain control circuit and said gate array for providing a digital output signal to said gate array, and a servo demodulator connected to said automatic gain control circuit for sampling and holding amplitudes of the burst signals and for providing, as an output, information relative to the amplitudes of the burst signals.

20. The hard disk drive as claimed in claim 19, wherein said processing means further comprises a central processing unit for receiving, from said servo demodulator, the information relative to the amplitudes of the burst signals.

21. A hard disk drive comprising a hard disk as recited in claim 1, said hard disk drive further comprising means for reading and processing said at least one of a servo sector number and a head bit recorded in said servo bursts.

22. The hard disk drive as claimed in claim 21, wherein said reading and processing means comprises a head for reading said at least one of a servo sector number and a head bit and a processor for processing said at least one of a servo sector number and a head bit.

23. The hard disk drive as claimed in claim 22, wherein said processor generates an output signal, said reading and processing means further comprising a gate array responsive to said output signal generated by said processor for determining a current position of said head.

24. The hard disk drive as claimed in claim 23, wherein said processor comprises a pre-amplifier, an automatic gain control circuit connected to said pre-amplifier for producing a controlled gain output, and a pulse detector connected between said automatic gain control circuit and said gate array for providing a digital output signal to said gate array.

25. The hard disk drive as claimed in claim 23, wherein said gate array generates a control signal, said hard disk drive further comprising control means responsive to said control signal for controlling said head.

26. The hard disk drive as claimed in claim 22, wherein said processor comprises a pre-amplifier and an automatic gain control circuit connected to said pre-amplifier for producing a controlled gain output.

27. A hard disk drive comprising a hard disk as recited in claim 2, said hard disk drive further comprising means for reading and processing said at least one of a servo sector number and a head bit recorded in said servo bursts.

28. The hard disk drive as claimed in claim 27, wherein said reading and processing means comprises a head for reading said at least one of a servo sector number and a head bit and a processor for processing said at least one of a servo sector number and a head bit.

29. The hard disk drive as claimed 28, wherein said processor generates an output signal, said reading and processing means further comprising a gate array responsive to said output signal generated by said processor for determining a current position of said head.

30. The hard disk drive as claimed in claim 29, wherein said processor comprises a pre-amplifier, an automatic gain control circuit connected to said pre-amplifier for producing a controlled gain output, and a pulse detector connected between said automatic gain control circuit and said gate array for providing a digital output signal to said gate array.

31. The hard disk drive as claimed in claim 29, wherein said gate array generates a control signal, said hard disk drive further comprising control means responsive to said control signal for controlling said head.

32. The hard disk drive as claimed in claim 28, wherein said processor comprises a pre-amplifier and an automatic gain control circuit connected to said pre-amplifier for producing a controlled gain output.

33. A hard disk drive comprising a hard disk in combination with means for reading and processing data recording on said hard disk;

wherein said hard disk comprises at least one recording surface, said recording surface bearing a plurality of servo sectors with each one of said servo sectors including a servo field and a data sector, said servo field having a gray code, a servo address mark and servo bursts with at least one of a servo sector number and a head bit recorded in said servo bursts; and wherein said head bit is recorded in A and B portions of said servo bursts to enable detection of said head bit by a head when said head is in an off-track state and an on-track state.

34. The hard disk drive as claimed in claim 33, wherein said at least one of a servo sector number and a head bit is recorded in said servo bursts by encoding pulse timing intervals of said servo bursts.

35. The hard disk drive as claimed in claim 33, wherein said servo sector number is recorded in P and Q portions of said servo bursts.

36. A hard disk drive comprising a hard disk in combination with means for reading and processing data recorded on said hard disk;

wherein said hard disk comprises at least one recording surface, said recording surface bearing a plurality of servo sectors with each one of said servo sectors including a servo field and a data sector, said servo field having a gray code, a servo address mark and servo bursts with at least one of a servo sector number and a head bit recorded in said servo bursts; and wherein said servo sector number is recorded in P and Q portions of said servo bursts to enable detection of said servo sector number by a head when said head is on an even numbered track and an odd numbered track.

37. The hard disk drive as claimed in claim 36, wherein said head bit is recorded in A and B portions of said servo bursts.

38. The hard disk as claimed in claim 2, wherein said head bit is recorded in A and B portions of said servo bursts to enable detection of said head bit by a head when said head is in an off track state and an on-track state.

39. The hard disk as claimed in claim 22, wherein said processor comprises a pulse detector for providing a digital output signal, and an encoder/decoder connected directly to said pulse detector for decoding the digital output signal during a read operation.

40. The hard disk drive as claimed in claim 28, wherein said processor comprises a pulse detector for providing a digital output signal, and an encoder/decoder connected directly to said pulse detector for decoding the digital output signal during a read operation.

41. The hard disk drive as claimed in claim 8, wherein said processor means further comprises a pulse detector connected to said automatic gain control circuit for providing a digital output signal, and an encoder/decoder connected directly to said pulse detector for decoding the digital output signal during a read operation.

42. The hard disk drive as claimed in claim 14, wherein said processing means further comprises an encoder/decoder connected directly to said pulse detector for decoding the digital output signal during a read operation.

43. The hard disk drive as claimed in claim 19, wherein said processing means further comprises an encoder/decoder connected directly to said pulse detector for decoding the digital output signal during a read operation.

44. The hard disk drive as claimed in claim. 33, wherein said reading and processing means comprises a pulse detector for providing a digital output signal, and an encoder/decoder connected directly to said pulse detector for decoding the digital output signal during a read operation.

45. The hard disk drive as claimed in claim 36, wherein said reading and processing means comprises a pulse detector for providing a digital output signal, and an encoder/decoder connected directly to said pulse detector for decoding the digital output signal during a read operation.

* * * * *